United States Patent
Ortmann et al.

(10) Patent No.: US 10,981,571 B2
(45) Date of Patent: Apr. 20, 2021

(54) METHODS AND SYSTEM FOR OPERATING A VEHICLE

(71) Applicant: Ford Global Technologies, LLC, Dearborn, MI (US)

(72) Inventors: Walter Joseph Ortmann, Saline, MI (US); Rajit Johri, Canton, MI (US); Kevin Ray Ruybal, Canton, MI (US); Jose Velazquez Alcantar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 16/127,822

(22) Filed: Sep. 11, 2018

(65) Prior Publication Data
US 2020/0079373 A1 Mar. 12, 2020

(51) Int. Cl.
| | |
|---|---|
| *B60W 30/14* | (2006.01) |
| *B60W 30/188* | (2012.01) |
| *B60W 10/08* | (2006.01) |
| *B60W 30/02* | (2012.01) |
| *B60W 40/11* | (2012.01) |
| *B60W 40/112* | (2012.01) |
| *B60W 40/114* | (2012.01) |

(52) U.S. Cl.
CPC .......... *B60W 30/188* (2013.01); *B60W 10/08* (2013.01); *B60W 30/02* (2013.01); *B60W 40/11* (2013.01); *B60W 40/112* (2013.01); *B60W 40/114* (2013.01); *B60W 2300/185* (2013.01); *B60W 2520/14* (2013.01); *B60W 2520/16* (2013.01); *B60W 2520/18* (2013.01); *B60W 2520/26* (2013.01); *B60W 2720/10* (2013.01); *B60W 2720/26* (2013.01); *B60W 2720/30* (2013.01)

(58) Field of Classification Search
None
See application file for complete search history.

(56) References Cited

U.S. PATENT DOCUMENTS

| | | | | |
|---|---|---|---|---|
| 9,682,710 | B2 * | 6/2017 | Darnell | B60W 10/111 |
| 2007/0255465 | A1 * | 11/2007 | Brown | B60G 17/0165 |
| | | | | 701/37 |
| 2008/0183353 | A1 * | 7/2008 | Post | B60T 8/17555 |
| | | | | 701/42 |
| 2010/0319567 | A1 * | 12/2010 | Kumar | B61C 15/06 |
| | | | | 105/34.1 |
| 2011/0172863 | A1 * | 7/2011 | Yu | B60L 1/10 |
| | | | | 701/22 |
| 2015/0203117 | A1 | 7/2015 | Kelly et al. | |
| 2015/0217767 | A1 * | 8/2015 | Kelly | B60K 28/16 |
| | | | | 701/93 |

(Continued)

FOREIGN PATENT DOCUMENTS

WO   WO-2016062380 A1 *  4/2016  .......... B60W 30/143

*Primary Examiner* — Redhwan K Mawari
*Assistant Examiner* — Melanie J Patrick
(74) *Attorney, Agent, or Firm* — Geoffrey Brumbaugh; McCoy Russell LLP

(57) ABSTRACT

Methods and systems for operating a driveline that includes one or more electric machine providing torque to one or more axles are described. In one example, a requested vehicle speed is adjusted responsive to at least one of vehicle yaw, vehicle roll, and vehicle pitch so that vehicle speed may be maintained at a requested value.

18 Claims, 9 Drawing Sheets

(56) References Cited

U.S. PATENT DOCUMENTS

| | | | |
|---|---|---|---|
| 2015/0291167 A1* | 10/2015 | Mair | B60W 10/06 |
| | | | 701/22 |
| 2015/0314678 A1* | 11/2015 | Ekonen | B60K 17/35 |
| | | | 180/197 |
| 2016/0236670 A1 | 8/2016 | Johri et al. | |
| 2017/0043774 A1 | 2/2017 | Kelly et al. | |
| 2017/0096061 A1* | 4/2017 | Sagefka | F16D 48/06 |
| 2017/0114871 A1* | 4/2017 | Linton | F16H 3/724 |
| 2017/0305406 A1 | 10/2017 | Dextreit et al. | |
| 2018/0093572 A1* | 4/2018 | Hall | B60L 7/26 |
| 2019/0263409 A1* | 8/2019 | Yasutomi | B60W 10/184 |

* cited by examiner

METHODS AND SYSTEM FOR OPERATING A VEHICLE

FIELD

The present description relates generally to methods and systems for controlling a driveline of a vehicle. The methods and systems may be particularly useful for vehicles that are driven off-road at times.

BACKGROUND/SUMMARY

A vehicle may be driven off-road from time to time for customer enjoyment or to perform a task or function. Rock crawling is one such off-road activity where a vehicle is driven over small and large rocks to scale a hill or to descend into a valley. The vehicle's speed may be difficult to command and control while the vehicle is traveling over rocks because the vehicle may pitch and roll as the vehicle's wheels travel over the rocks. In addition, it may not be desirable to reduce vehicle speed to zero during some conditions when driving over rocks because it may be difficult to maintain the vehicle's position when vehicle speed is reduced to zero. Consequently, it may be desirable to maintain at least a slow vehicle speed when a vehicle is crawling over rocks. However, because the rocks may be of various sizes and oriented in various ways, it may be difficult to maintain a requested vehicle speed while crawling over the rocks. As a result, it may require significant effort by a driver of the vehicle to successfully negotiate the rocks that are in the vehicle's path of travel.

The inventors herein have recognized the above-mentioned issues and have developed a driveline operating method, comprising: operating a vehicle at a requested speed in a speed control mode via a controller; and adjusting the requested speed via the controller according to a value of vehicle pitch.

By adjusting a requested speed of a vehicle according to a value vehicle pitch, it may be possible to provide the technical result of improving vehicle speed control when a vehicle is traveling over rocks or roads that have high gradients. In one example, a vehicle speed command is reduced when gravity acting on the vehicle in the vehicle's present orientation tends to increase vehicle speed in a forward direction of vehicle travel. The vehicle speed command may be increased when gravity acting on the vehicle in the vehicle's present orientation tends to decrease vehicle speed. The adjustment to the requested vehicle speed may help to maintain vehicle speed at a speed that is requested by a human driver of the vehicle.

The present description may provide several advantages. In particular, the approach may improve vehicle speed control. Further, the approach may improve a vehicle's ability to negotiate difficult terrain. In addition, other aspects of the approach may improve the vehicle's ability to exit stuck conditions when negotiating rocks or other driving surfaces that may cause the vehicle to get stuck.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
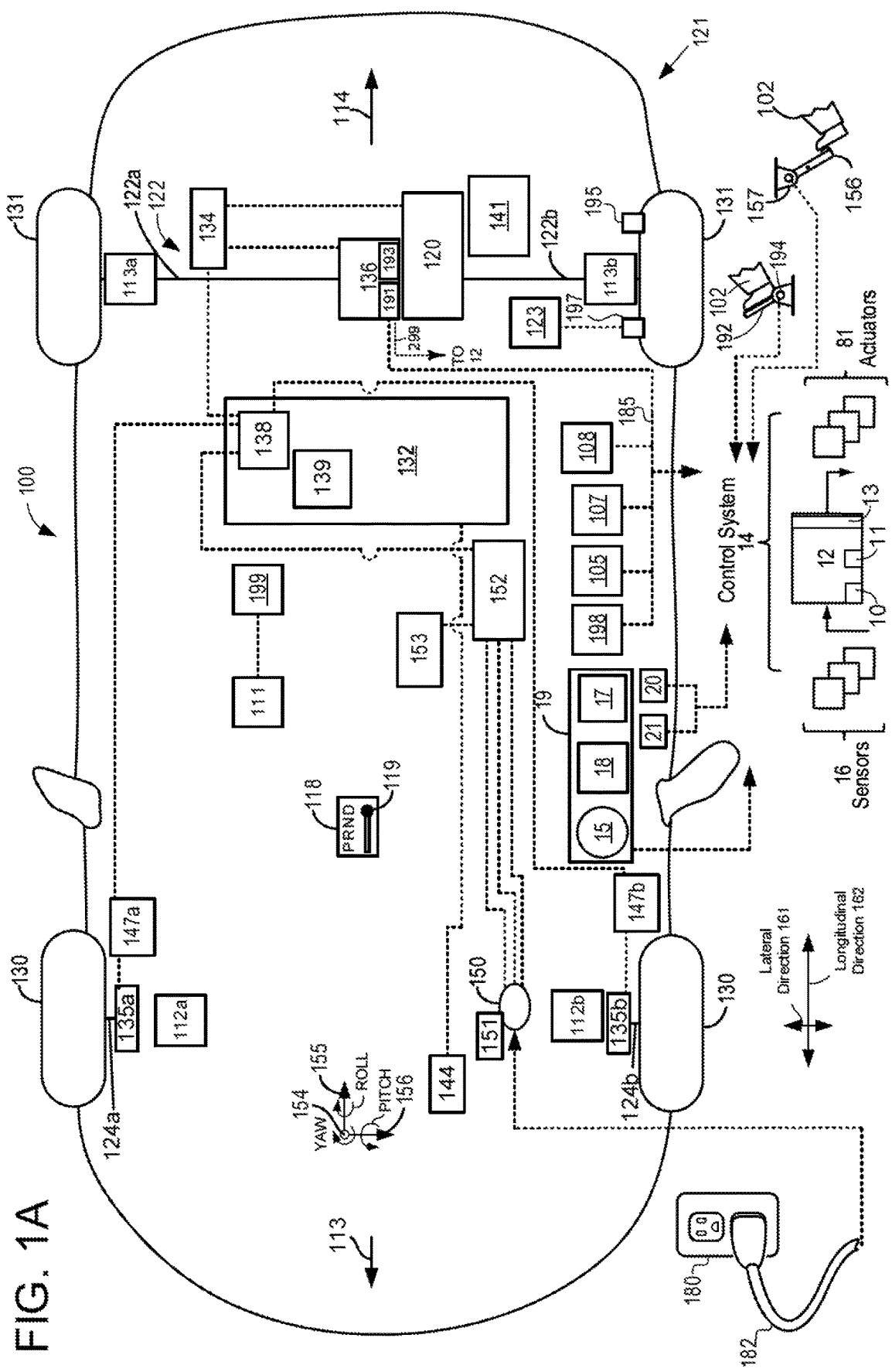
FIG. 1A is a schematic diagram of a first vehicle driveline.
Figure 1B:
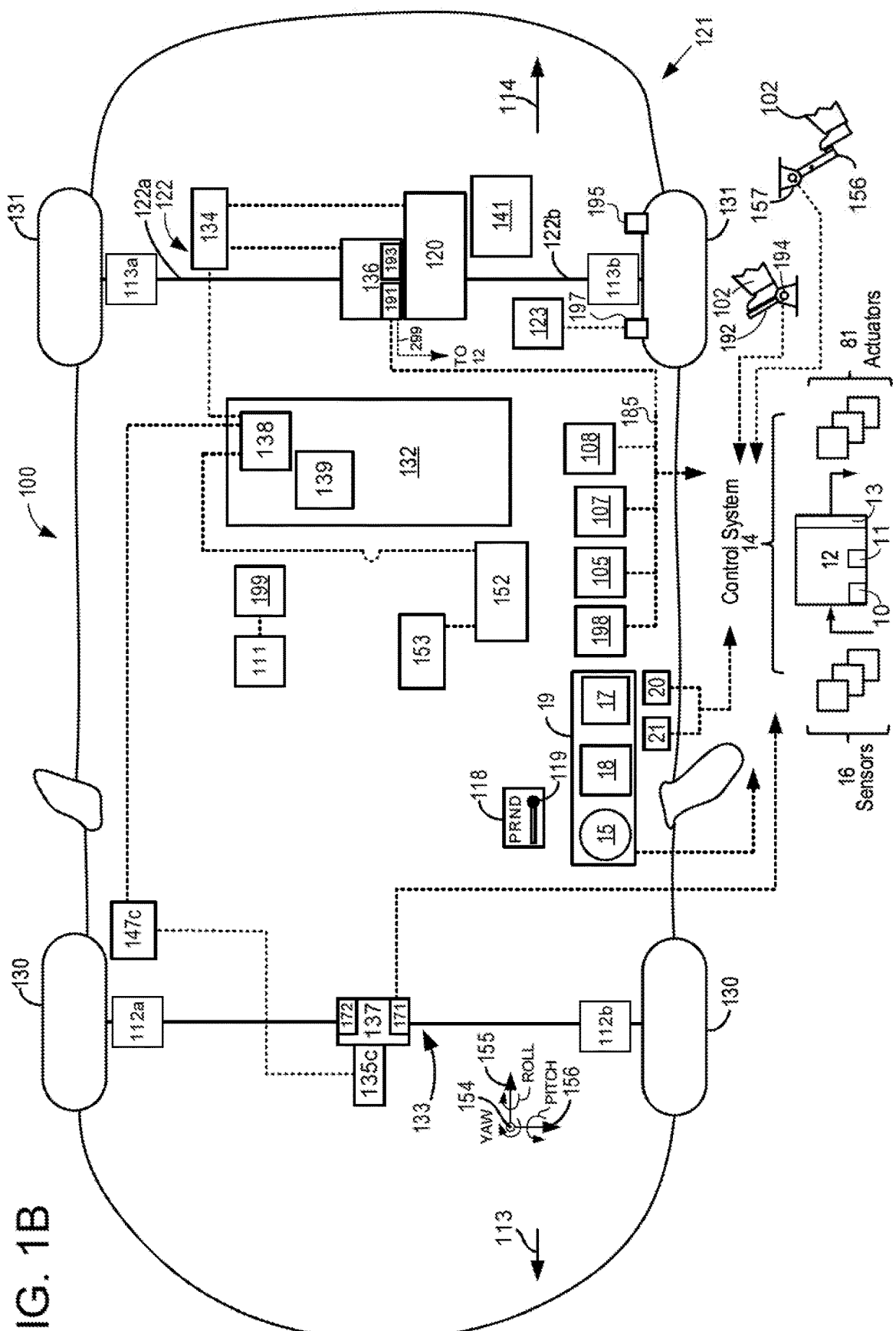
FIG. 1B is a schematic diagram of a second vehicle driveline.
Figure 1C:
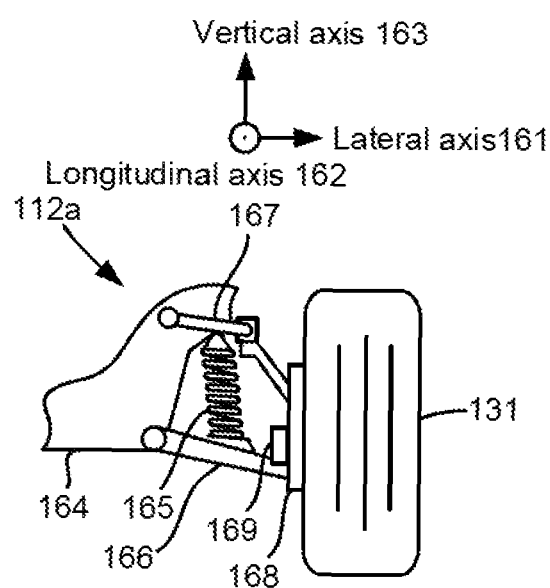
FIG. 1C is a schematic diagram of a vehicle suspension.
Figure 2:
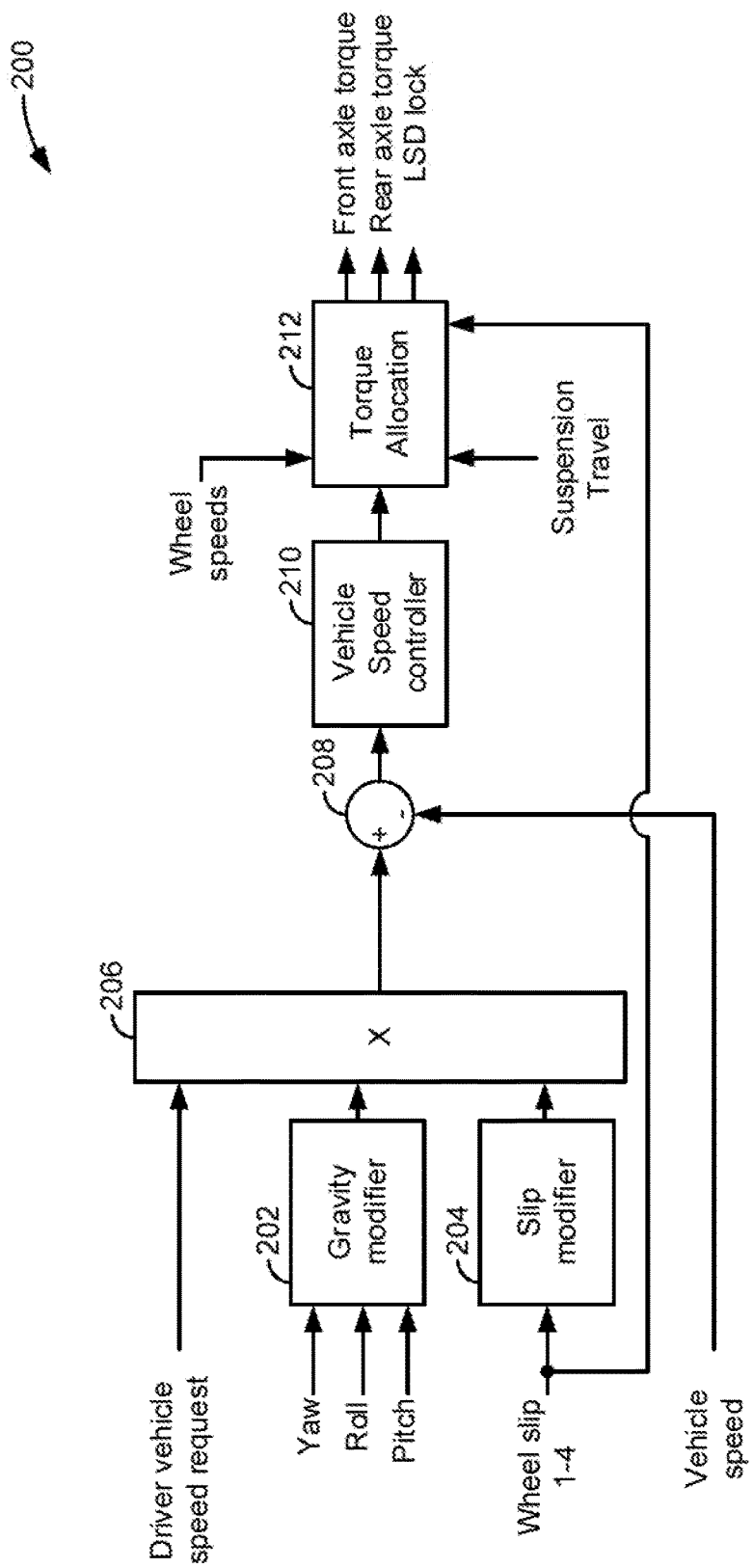
FIG. 2 is a block diagram of a vehicle speed control system.
Figure 3:
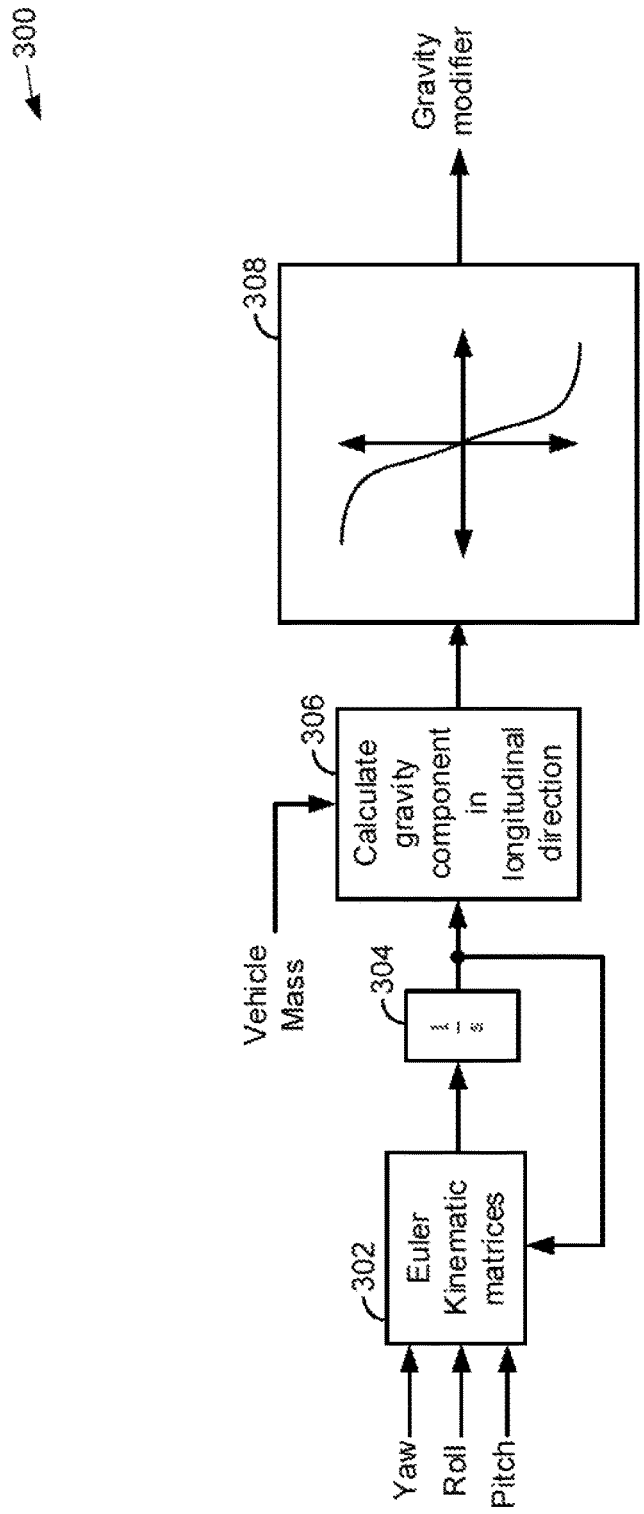
FIG. 3 is a block diagram of a gravity modification feature of the vehicle speed control system shown in FIG. 2.
Figure 4:
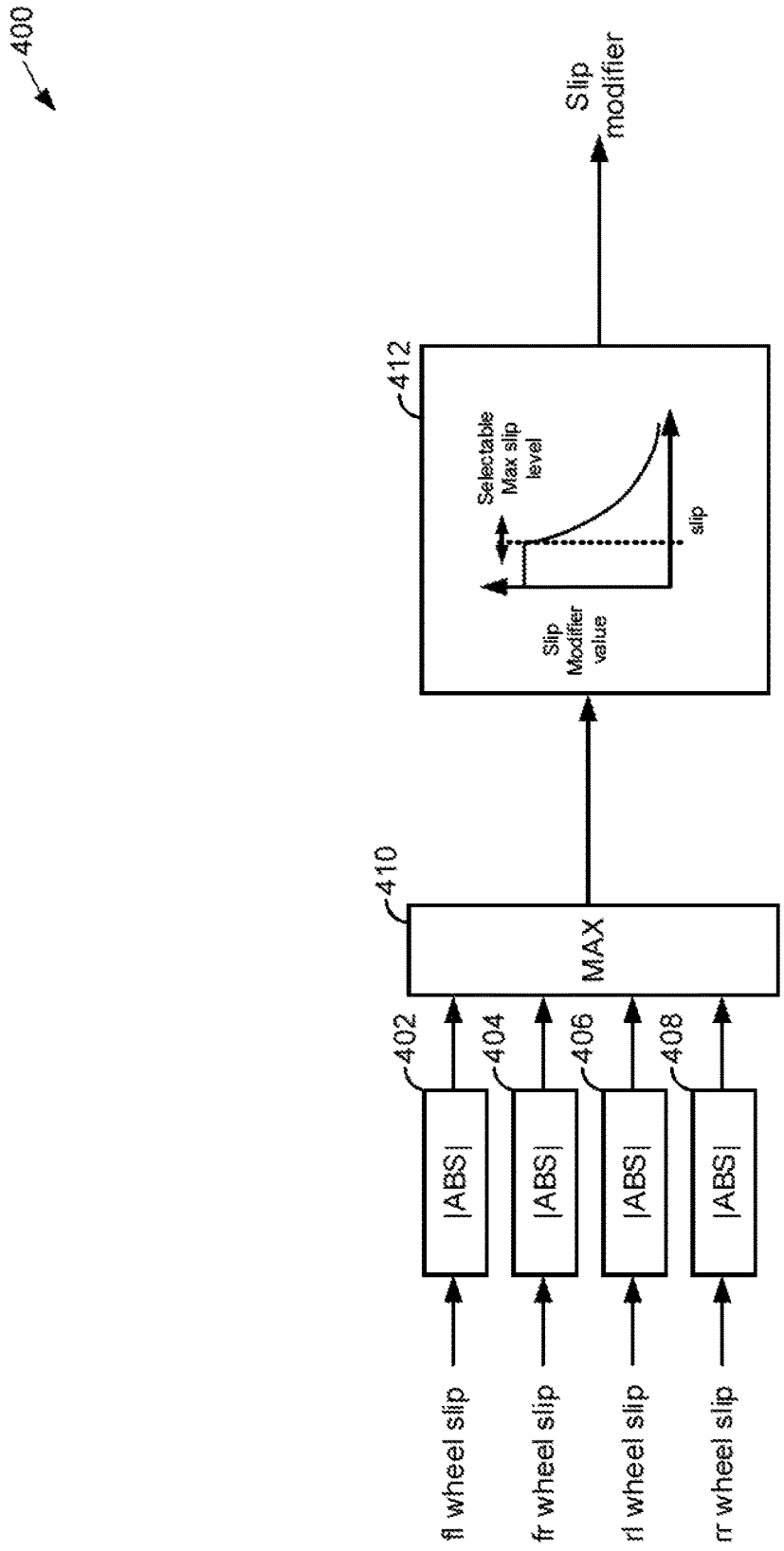
FIG. 4 is a block diagram of a wheel slip modification feature of the vehicle speed control system shown in FIG. 2.
Figure 5:
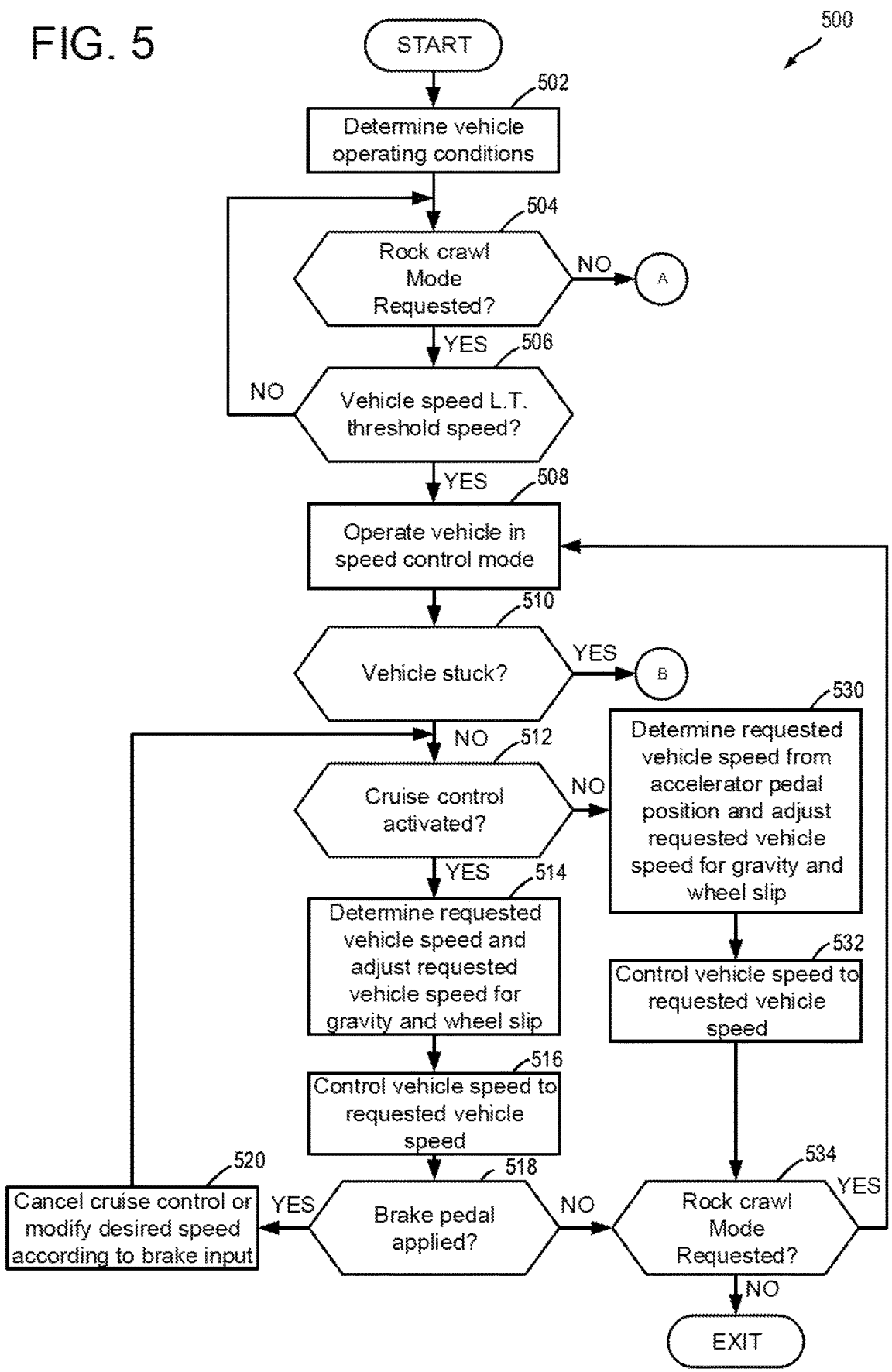
FIGS. 5 and 6 show a flowchart of a method for operating a vehicle driveline.
Figure 6:
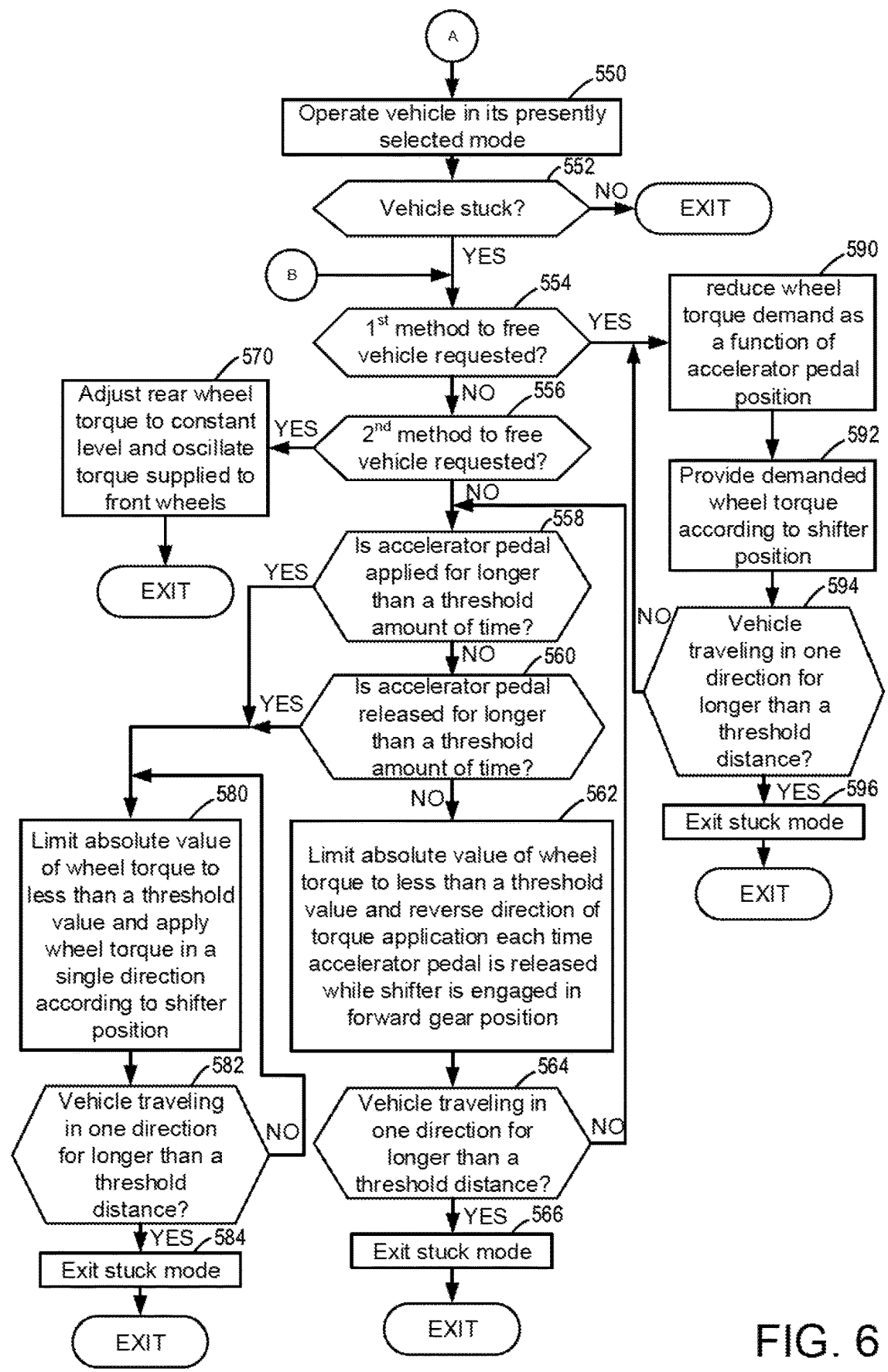
Figure 7:
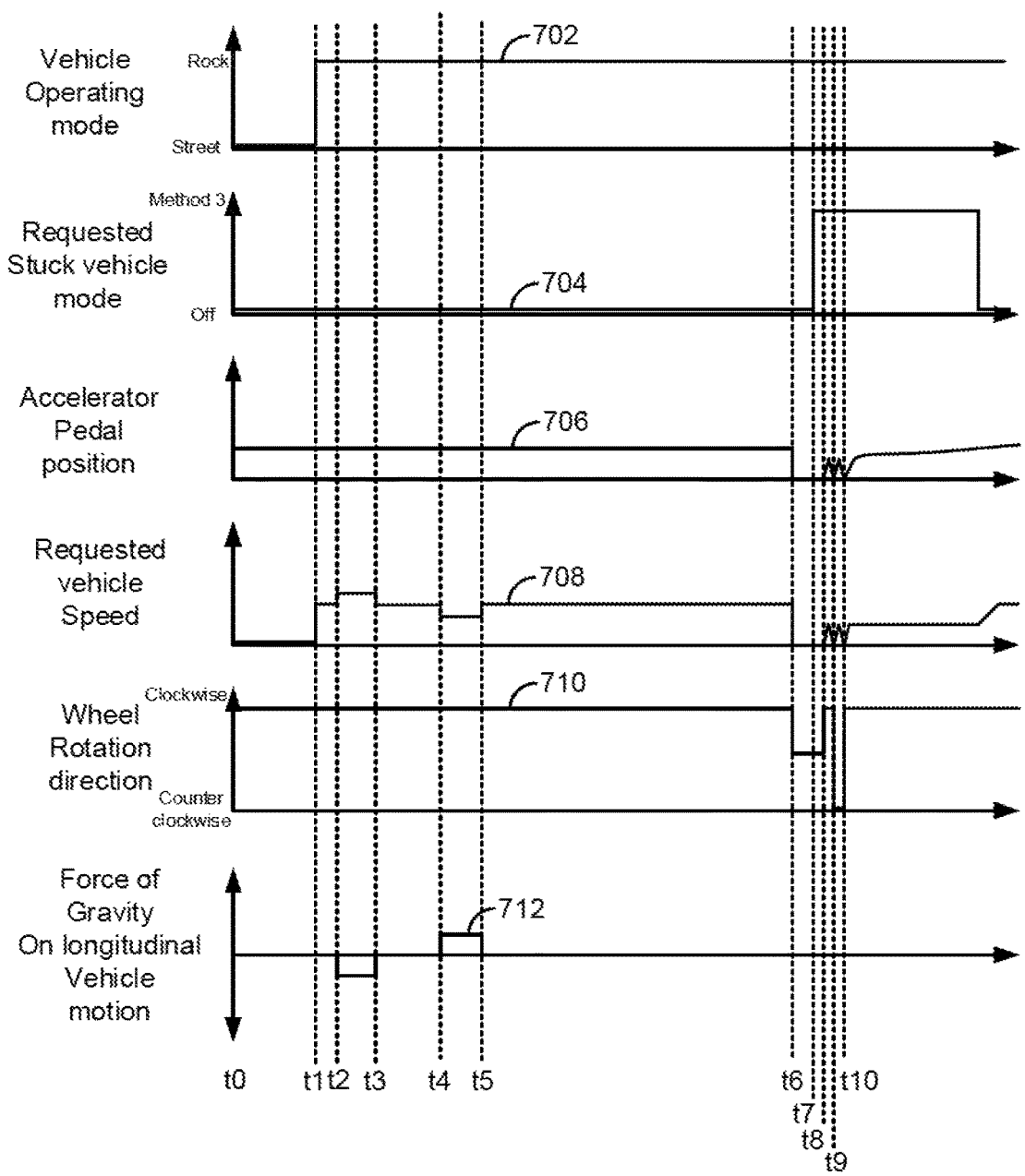
FIG. 7 shows an example vehicle operating sequence according to the method of FIGS. 5 and 6.

The following description relates to systems and methods for operating a driveline of a vehicle. FIGS. 1A and 1B show example vehicle drivelines that includes electric machines for vehicle propulsion. FIG. 1C shows an example suspension for the vehicle. FIGS. 2-4 show block diagrams of a vehicle speed controller. FIGS. 5 and 6 show a flowchart of a method for operating a vehicle driveline. The method may improve vehicle speed control and allow the vehicle to negotiate driving paths that include various sizes of rocks that are oriented in a variety of different ways. An example vehicle operating sequence according to the method of FIGS. 5 and 6 is shown in FIG. 7.

FIG. 1A illustrates an example vehicle propulsion system 100 for vehicle 121. Throughout the description of FIG. 1A, mechanical connections between various components is illustrated as solid lines, whereas electrical connections between various components are illustrated as dashed lines. The controller 12 receives signals from the various sensors shown in FIGS. 1A-1C and employs the actuators shown in FIGS. 1A-1C to adjust driveline operation based on the received signals and instructions stored in memory of controller 12.

Vehicle propulsion system 100 includes electric machines 120, 135a, and 135b as propulsion sources. Electric machines 120, 135a, and 135b may consume electrical energy to produce electric machine output or they may generate electrical power to charge an electric energy storage device 132 via the vehicle's kinetic energy. Right front wheel electric machine 135a is coupled to front wheel 130 via right front axle shaft 124a. Left front wheel electric machine 135b is coupled to front wheel 130 via left front axle shaft 124b. Electric machines 135a and 135b may directly drive front wheels 130. Electric machine 120 is coupled to rear wheels 131 via rear axle 122. In some examples, rear axle 122 may comprise two half shafts, for example first half shaft 122a, and second half shaft 122b. The rear axle 122 may be driven purely electrically and exclusively via electric machine 120. Rear drive unit 136 may transfer power from electric machine 120 to axle 122 resulting in rotation of rear driven wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple electric machine 120 from wheels 131. Rear drive unit 136 may be directly coupled to electric machine 120 and axle 122. Vehicle 121 may travel in a forward direction 113 when front wheels 130 and rear wheels 131 are rotated in a clockwise direction. Vehicle 121 may travel in a reverse direction 114 when front wheels 130 and rear wheels 131 are rotated in a counter-clockwise direction.

Front right suspension 112a and front left suspension 112b provide support and compliance between front wheels 130 and a body of vehicle 121 as shown in further detail in FIG. 1C. Rear right suspension 113a and rear left suspension 113b provide support and compliance between rear wheels 131 and a body of vehicle 121 as shown in further detail in FIG. 1C. As such, front right suspension 112a, front left suspension 112b, rear right suspension 113a, and rear left suspension 113a provide support and compliance between a surface the vehicle rides upon (e.g., a road or the earth) and a body of vehicle 121.

Electric machines 120, 135a, and 135b may receive electrical power from onboard electrical energy storage device 132. Furthermore, electric machines 120, 135a, and 135b may provide a generator function to convert engine output or the vehicle's kinetic energy into electrical energy, where the electrical energy may be stored at electric energy storage device 132 for later use by the electric machines 120, 135a, and 135b. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device. Second inverter (ISC2) 147a may convert alternating current generated by electric machine 135a to direct current for storage at the electric energy storage device 132 or provide alternating current to electric machine 135a to propel vehicle 121. Likewise, third inverter (ISC3) 147b may convert alternating current generated by electric machine 135b to direct current for storage at the electric energy storage device 132 or provide alternating current to electric machine 135b to propel vehicle 121.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 135a, electric machine 135b, electric machine 120, energy storage device 132, etc. Control system 14 may receive sensory feedback information from one or more of electric machine 135a, electric machine 135b, electric machine 120, energy storage device 132, etc. Further, control system 14 may send control signals to one or more of electric machine 135a, inverter 147a, electric machine 135b, inverter 147b, electric machine 120, inverter 134, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle). As a non-limiting example, vehicle propulsion system 100 may be configured as a plug-in electric vehicle (EV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw 154, pitch 156, roll 155, lateral acceleration 161, and longitudinal acceleration 162 are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension control system 111 responsive to input from inertial sensors 199. Active suspension control system 111 may comprise hydraulic, electrical, and/or mechanical devices that control the vehicle height on an individual corner basis (e.g., four corner independently controlled vehicle heights), on an axle-by-axle basis (e.g., front axle and rear axle vehicle heights), or a single vehicle height for the entire vehicle. Active suspension control system 111 may be coupled to front suspension 112a, front suspension 112b, rear suspension 113a, and rear suspension 113b. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a power distribution box (PDB) 144. PDB 144 may be used for routing electrical power throughout various circuits and accessories in the vehicle's electrical system.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with electric machine 135a, electric machine 135b, and electric machine 120, etc., may communicate information to controller 12, regarding various states of electric machine operation. Controller 12 includes non-volatile (e.g., read-only) memory 10, a micro-processor 11, and inputs/outputs 13 (e.g., A/D converters, D/A converters, digital inputs, digital outputs).

Vehicle propulsion system 100 may further include a shift selector 118 for vehicle operator 102 to command a direction of travel for vehicle 121. Shift selector 118 may cause controller 12 to rotate wheels 130 and 131 in a clockwise direction, thereby propelling vehicle 121 in forward direction 113 when lever 119 is in a drive (D) position. Shift selector 118 may cause controller 12 to rotate wheels 130 and 131 in a counter-clockwise direction, thereby propelling vehicle 121 in reverse direction 114 when lever 119 is in a reverse (R) position.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an human/machine interface 15 (which may also be referred to as a human/machine interface) via which the vehicle operator may adjust the operating status of the vehicle. Specifically, the human/machine interface 15 may be configured to initiate and/or terminate operation of the vehicle driveline (e.g., electric machine 120, electric machine 135a, and electric machine 135b) based on an operator input. Various examples of the human/machine interface 15 may include interfaces that require a physical apparatus, such as an active key, that may be inserted into the human/machine interface 15 to start the engine 110 and turn on the vehicle, or may be removed to shut down the engine 110 and turn off the vehicle. Other examples may include a passive key that is communicatively coupled to the human/machine interface 15. The passive key may be configured as an electronic key fob or a smart key that does not have to be inserted or removed from the human/machine interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine. In some examples, the operator may select the direction of vehicle travel via the operator interface in place of shift selector 118.

FIG. 1B is a schematic of an alternative vehicle driveline. The components of the vehicle driveline shown in FIG. 1B that are the same as the components shown in FIG. 1A are identified with the same numbering used in FIG. 1A. Components that are unique to the configuration of FIG. 1B are identified with new component numbers. In this configuration, the vehicle driveline includes a front axle 133. Electric machine 135c may provide positive or negative torque to front wheels 130 via front drive unit 137, which may include a differential 172. Electrically controlled differential clutch 171 may be locked or opened to that adjust torque transfer to front axle 133. In some examples, the electric machine 135c and the front drive unit 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. Inverter system controller (ISC1) 147c may convert alternating current generated by electric machine 135c to direct current for storage at the electric energy storage device 132 and vice versa. The other components shown in FIG. 1B may operate as previously described.

Referring now to FIG. 1C, an example partial view of vehicle body 164 and front right suspension 112a of vehicle 121 is shown. Vertical 163, longitudinal 162, and lateral 161 axes are indicted via the illustrated coordinates.

Front right suspension 112a includes an upper control arm 167, a lower control arm 166, a combined spring/damper 165, and wheel hub 168. Wheel 131 is directly coupled to hub 168 and an axle shaft (not shown) is coupled to wheel 131 to rotate wheel 131 independently from front right suspension 112a. Front right suspension 112a provides support and compliance between vehicle body 164 and wheel 131. Vehicle body 164 may support the vehicle's passenger cabin (not shown) and exterior panels (not shown) along with other vehicle components. Compression of front right suspension 112a may be determined via suspension height sensor 169. Front left suspension 112b, rear right suspension 113a, and rear left suspension 113b may be configured in a similar way. In other examples, the vehicle suspension may include springs and dampers absent upper and lower control arms. Further, other vehicle suspension systems may be envisioned such that the front right suspension 112a is a non-limiting vehicle suspension system. The system of FIGS. 1A-1C provides for a driveline system, comprising: a first electric machine coupled to a first axle; a second electric machine coupled to a second axle; a shift selector to select a direction of vehicle travel; and a controller including executable instructions stored in non-transitory memory to rotate the first axle in a first direction and to rotate the first axle in a second direction according to accelerator pedal position while the shift selector is maintained in a single position. The driveline system further comprises additional instructions to operate a vehicle that includes the first and second electric machines at a requested speed in a speed control mode, and adjusting the requested speed according to at least one of vehicle pitch, vehicle roll, and vehicle yaw. The driveline system further comprises additional instructions to distribute a torque to operate a vehicle at a requested speed to the first axle and the second axle according to a vehicle suspension compression amount. The driveline system further comprises additional instructions to rotate the second axle in the first direction and to rotate the second axle in the second direction according to the accelerator pedal position while the shift selector is maintained in the single position. The driveline system include where the first axle changes from rotating in the first direction to rotating in the second direction in response to releasing the accelerator pedal. The driveline system includes where the single position is a position that indicates that the vehicle is to travel in a forward direction.

Referring now to FIG. 2, a block diagram of a vehicle speed control system is shown. The vehicle speed control system of FIG. 2 may be particularly suited for controlling vehicle speed when a vehicle is engaged in a rock crawling mode.

Vehicle speed controller 200 includes a driver vehicle speed request that is input to multiplication block 206. The driver vehicle speed request may be input via an accelerator pedal or via a cruise control system speed input through a human/machine interface. For example, controller 12 may convert an accelerator pedal position into a driver vehicle speed request or amount. The driver vehicle speed request may be limited such that it does not exceed an upper vehicle speed threshold (e.g., 15 kilometers/hour) when the vehicle is in rock crawl mode. Accelerometer outputs for vehicle yaw, pitch, and roll are input to gravity modifier block 202. The operations performed in gravity modifier block 202 are described in greater detail in the description of FIG. 3. Output of the gravity modifier block 202 is input to multiplication block 206. Wheel slip for each vehicle wheel is input to slip modifier block 204. In one example, the slip of an individual wheel may be determined as a difference between an actual wheel speed of the wheel and a natural speed of the wheel. The natural speed of a wheel may be determined or estimated via adjusting a reference speed of the vehicle according to steering angle and the rolling radius of the wheel, and the reference speed of the vehicle may be determined via a fifth wheel or a global positioning system, for example. The driver requested vehicle speed is multiplied by output the gravity modifier block 202 and output from the slip modifier block 204 at multiplier block 206 to provide a modified driver requested vehicle speed. The output of multiplier block 206 is input to summing junction 208.

The measured or actual vehicle speed may be subtracted from the modified driver requested vehicle speed at summing junction 208 to generate a vehicle speed error. The actual or measured vehicle speed may be determined from a combination of wheel speed sensors and/or a global positioning system. Output of summing junction 208 is input to vehicle speed controller 210.

In one example, vehicle speed controller 210 may be a proportional/integral controller whereby the vehicle speed error is integrated and multiplied by integral and proportional gains to generate a wheel or driveline torque demand that is output from vehicle speed controller block 210. In other examples, vehicle speed controller may be a linear quadratic regulator or other known controller.

The wheel torque demand output from vehicle speed controller block 210 is input to torque allocation block 212 where it may be distributed to the front and rear axles. Input from the four vehicle suspension height sensors and four wheel speed sensors are also input to block 212.

In one example, the allocation of torque from the torque command generated by the vehicle speed control is such that an axle that is carrying the most weight is supplied with a greater portion of the torque command generated by the vehicle speed controller. The average slip of the front and rear axles may be expressed via the following equations:

$$\text{Axle\_slip\_front} = R_\omega\left(\frac{\omega_{fl} + \omega_{fr}}{2}\right) - Vref_{est}$$

$$\text{Axle\_slip\_rear} = R_\omega\left(\frac{\omega_{rl} + \omega_{rr}}{2}\right) - Vref_{est}$$

where Axle_slip_front is the axle slip of the front axle, Axle_slip_rear is the axle slip of the rear axle, $R\omega$ is the rolling radius of the wheel, $\omega_{fl}$ is speed of the front left wheel, $\omega_{fr}$ is speed of the front right wheel, $\omega_{rl}$ is speed of the rear left wheel, $\omega_{rr}$ is speed of the right rear wheel, and $Vref_{est}$ is the estimated actual or referenced speed of the vehicle. The actual or reference vehicle speed may be estimated based on one or more wheel speeds, or via a global positioning system, or via another known way.

The allocation of torque to the front and rear axles may also be based on compression of the suspension at each wheel. In one example, compression of the front suspension and compression of the rear suspension is determined via the following equations:

$$\text{Axle\_f\_comp} = \max(x\_fl, x\_fr)$$

$$\text{Axle)r\_comp} = \max(x\_rl, x\_rr)$$

where Axle_f_comp is the amount of compression of the front axle suspension, max is a function that returns a maximum value of the arguments enclosed in parenthesis, x_fl is a compression amount of the suspension associated with the front left wheel, x_fr is a compression amount of the suspension associated with the front right wheel, Axle_r_comp is the amount of compression of the rear axle suspension, x_rl is a compression amount of the suspension associated with the rear left wheel, and x_rr is a compression amount of the suspension associated with the rear right wheel. The values of x_fl, x_fr, x_rl, and x_rr may be determined from suspension height sensor output.

Once the amounts of front axle suspension compression and rear axle suspension compression are determined, a scaling factor for allocating torque to the front and rear axles may be determined via referencing a table or function that is referenced or indexed via the front axle suspension compression amount and the rear axle suspension compression amount. Values in the table or function may be empirically determined via driving a vehicle over various types of terrain and modifying torque distribution between the front and rear axles. The table may output a value (e.g., a real number between 0 and 1) that is the basis for distributing torque to the front and rear axles responsive to suspension compression. The suspension compression amount may be affected by the position of the vehicle with respect to the surface that the vehicle is traveling upon.

Two other scaling factors for allocating torque to the front and rear axis based on slip of the front and rear axles may be determined. In one example, an upper threshold limit (e.g., a maximum) of wheel slip for the front axle may be determined via indexing or referencing a table that outputs an empirically determined upper threshold limit of wheel slip for the front axle. The table may be referenced via the reference vehicle speed and the driver requested vehicle speed. The table outputs the upper threshold limit of wheel slip for the front axle. The upper threshold limit of wheel slip for the rear axle may be determined in a similar way. If Axle_slip_front is ≥the upper threshold limit of wheel slip for the front axle, then the scaling factor for allocating torque to the front and rear axles is reduced at a predetermined rate (front axle slip scale) until front axle wheel slip is less than the upper threshold limit of wheel slip for the front axle. If Axle_slip_rear is ≥the upper threshold limit of wheel slip for the rear axle, then the scaling factor for allocating torque to the front and rear axles is increased at a predetermined rate (rear_axle_slip_scale) until rear axle wheel slip is less than the upper threshold limit of wheel slip for the rear axle. Torque output from the vehicle speed controller to the respective front and rear axles may be expressed as:

Torque_front_axle=$Vsc$_torque·(Comp_scal_fact−front_axle_slip_scale)

Torque_rear_axle=$Vsc$_torque·(1−(Comp_scal_fact−rear_axle_slip_scale))

where Torque_front_axle is the portion of the vehicle speed controller output torque that is allocated and delivered to the front axle, Vsc_torque is the torque output of the vehicle speed controller, Comp_cal_fact is the scaling factor for suspension compression, front axle_slip_scale is a scaling factor for adjusting torque allocated to the front axle according to front axle slip, Torque_rear_axle is the portion of the vehicle speed controller output torque that is allocated and delivered to the rear axle, and rear_axle_slip_scale is a scaling factor for adjusting torque allocated to the rear axle according to rear axle slip. Limited slip differentials in the rear and/or front axle are also locked when rock crawl mode is engaged. The value of Torque_front_axle is output from block 212 and one or more electric machines of the front axle deliver the Torque_front_axle torque amount. It should be noted that the value of Torque_front_axle may be adjusted for any gear ratios in the front axle. Likewise, the value of Torque_rear_axle is output from block 212 and one or more electric machines of the rear axle deliver the Torque_rear_axle torque amount.

Referring now to FIG. 3, a block diagram 300 for modifying requested vehicle speed according to Earth's gravity is shown. The block diagram of FIG. 3 is a detailed block diagram of block 202 of FIG. 2.

Vehicle yaw ($\omega_{yaw}$), roll ($\omega_{roll}$), and pitch ($\omega_{pitch}$) rates are input to block 302 from vehicle sensors. The following equations are solved in block 302:

$$\frac{d\theta}{dt} = \cos\phi \omega_{pitch} - \sin\phi \omega_{yaw}$$

$$\frac{d\psi}{dt} = \frac{\sin\phi}{\cos\theta}\omega_{pitch} + \frac{\cos\phi}{\cos\theta}\omega_{yaw}$$

$$\frac{d\phi}{dt} = \omega_{roll} + \frac{\sin\phi\sin\theta}{\cos\theta}\omega_{pitch} + \frac{\cos\phi\sin\theta}{\cos\theta}\omega_{yaw}$$

where $\theta$ is the yaw angle, $\phi$ is the roll angle, and $\psi$ is the pitch angle, $\omega_{yaw}$ is the yaw rate, $\omega_{roll}$ is the roll rate, and $\omega_{pitch}$ is the pitch rate. The derivatives of $\theta$, $\psi$, and $\phi$ are output from block 302 to block 304 where they are integrated to generate $\theta$, $\psi$, and $\phi$, which are input to block 306.

At block 306, a gravity component adjustment factor that compensates for the influence of Earth's gravity on vehicle speed in the longitudinal direction of the vehicle is determined. The values of θ, ψ, and φ are input to the following matrices:

$$\Phi = \begin{vmatrix} 1 & 0 & 0 \\ 0 & \cos\phi & -\sin\phi \\ 0 & \sin\phi & \cos\phi \end{vmatrix}$$

$$\Theta = \begin{vmatrix} \cos\theta & 0 & \sin\theta \\ 0 & 1 & 0 \\ -\sin\theta & 0 & \cos\theta \end{vmatrix}$$

$$\Psi = \begin{vmatrix} \cos\psi & -\sin\psi & 0 \\ \sin\psi & \cos\psi & 0 \\ 0 & 0 & 1 \end{vmatrix}$$

The three matrices provide a way of translating a velocity in a reference frame of the vehicle body (e.g., the center of gravity of the vehicle) to an inertial frame (e.g., a reference frame of the Earth). In particular, the matrices may be multiplied to generate a velocity rotation matrix $R_{b2i,v}$ that when multiplied by a velocity of the vehicle in the vehicle body frame generates a velocity in the inertial frame, which may be characterized as:

$$V_i = R_{b2i,v} V_b \text{ where } R_{b2i,v} = \Omega\Theta\Phi$$

where $R_{b2i,v}$ is the rotation matrix for translating a velocity in the vehicle body frame to the inertial frame, $V_i$ is velocity in the inertial frame, and $V_b$ is velocity in the body frame. A rotation matrix for translating a velocity in the inertial frame to a velocity in the vehicle body frame may be described by:

$$R_{i2b,v} = R_{b2i,v}^{-1}$$

where $R_{i2b,v}$ is the rotation matrix for translating a velocity in the inertial frame to the body frame. A force rotation matrix may then be determined for rotating a force from the inertial frame to the vehicle body frame by:

$$F_b = R_{i2b,F} F_i \text{ where } R_{i2b,F} = R_{i2b,v}^T$$

where Fb is force in the vehicle body frame, Fi is force in the inertial frame, and T indicates the matrix transpose operator. A vector of Earth's gravity in the inertial frame may be described by:

$$F_{g,i} = [0\ 0\ -mg]^T$$

where $F_{g,i}$ is the gravity vector in the inertial frame, m is vehicle mass, g is the gravity constant, and T is the matrix transpose notation. The force of gravity in the body frame is indicated by:

$$F_{g,b} = R_{i2b,F} F_{g,i}$$

where $F_{g,b}$ is the gravity vector in the vehicle body frame. The force that the Earth's gravity exerts on the vehicle in the longitudinal direction is given by:

$$F_{g,b,x}[1\ 0\ 0]F_{g,b}$$

where Fg,b,x is the force of gravity on the vehicle's body in the longitudinal direction of the vehicle. Block 306 outputs the force of gravity on the vehicle's body in the longitudinal direction of the vehicle to block 308.

At block 308, the force of gravity on the vehicle's body in the longitudinal direction of the vehicle is applied to reference or index a function or table that outputs an empirically determined gravity modifier value. The gravity modifier value may be determined via operating the vehicle on a surface at various positions and adjusting values in the table so as to maintain vehicle speed at the requested vehicle speed even though the vehicle's position changes. The gravity modifier value (e.g., a real number) is output to block 206 of FIG. 2.

Referring now to FIG. 4, a block diagram 400 for generating a wheel slip modifier for a vehicle speed control system is shown. The front left (fl), front right (fr), rear right (rr), and rear left (rl) wheel slip amounts are input to blocks 402-408 where the absolute value of each wheel slip amount is determined and output to block 404. Block 410 selects the maximum wheel slip amount of the four wheel slip values and it outputs the maximum wheel slip value to block 412. For example, if fl wheel slip is 3 rpm and fr wheel slip is 2 rpm, rl wheel slip is 2 rpm, and rr wheel slip is 2 rpm, block 410 outputs a value of 3 rpm.

The maximum wheel slip is applied to index or reference a function or table that outputs an empirically determined wheel slip modifier value (e.g., a real number). In one example, the slip modifier value is equal to one up to a threshold value of wheel slip (e.g., a maximum wheel slip value), and then the wheel slip modifier is decreased toward a value of zero. In this way, the driver demand speed may be reduced when a threshold amount of wheel slip is detected.

Referring now to FIGS. 5 and 6, an example method for operating a vehicle driveline is shown. The method of FIGS. 5 and 6 may be incorporated into and may cooperate with the system of FIGS. 1A-1C. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include, but are not limited to engine temperature, vehicle speed, wheel speeds, vehicle operating mode, accelerator pedal position, brake pedal position, and vehicle reference speed. Method 500 proceeds to 504 after determining vehicle operating conditions.

At 504, method 500 judges if a rock crawl mode is requested via a human or autonomous driver. In one example, a request for a rock crawl mode may be made via a human/machine interface. A request for entering rock crawl mode may be indicated and stored in controller memory. If method 500 judges that rock crawl mode has been requested, the answer is yes and method 500 proceeds to 506. Otherwise, the answer is no and method 500 proceeds to 550.

At 506, method 500 judges if vehicle speed is less than (L.T.) a threshold speed (e.g., 15 kilometers/hr). Method 500 may determine vehicle speed via wheel speed sensor data or a global positioning system. If method 500 judges that vehicle speed is less than the threshold speed, the answer is yes and method 500 proceeds to 508. Otherwise, the answer is no and method 500 returns to 504.

At 508, method 500 operates the vehicle in a speed control mode. In vehicle speed control mode, driveline torque is adjusted so that actual vehicle speed follows a desired or requested vehicle speed. The requested vehicle speed may be a constant or a varying value. The driveline torque output may be increased when actual vehicle speed is less than the requested vehicle speed. The driveline torque output may be decreased when actual vehicle speed is greater than the requested vehicle speed. Method 500 also enters a rock crawling mode. The vehicle's speed may be limited to less than a threshold speed (e.g., 15 kilometers/hr)

while the vehicle is engaged in rock crawling mode. Further, the accelerator pedal position may be converted into a requested vehicle speed via the controller in rock crawl mode, whereas the accelerator pedal position may be converted to a requested driveline torque output when the vehicle is not in a rock crawl mode. Further, scaling of the accelerator pedal position may be adjusted when such that a large accelerator pedal input generates a small vehicle speed request increase when the vehicle enters rock crawl mode. Additionally, differential clutches of the front and rear axles may be commanded locked when the vehicle enters rock crawl mode and the differential clutches of the front and rear axles may be commanded unlocked when the vehicle exits rock crawl mode. Method 500 proceeds to 510.

At 510, method 500 judges whether or not the vehicle is stuck (e.g., providing lack of forward or reverse progress in a vehicle drive path when the wheels are rotating). In one example, method 500 may judge that the vehicle is stuck if vehicle wheel speed exceeds actual vehicle speed (e.g., speed of the vehicle's body) by a threshold speed. If method 500 judges that the vehicle is stuck, the answer is yes and method 500 proceeds to 554. Otherwise, the answer is no and method 500 proceeds to 512.

At 512, method 500 judges if the vehicle cruise control system is activated. The cruise control system may be activated by a human driver requesting activation of the vehicle cruise control system. The vehicle speed is controlled to a requested vehicle speed that has been requested by the vehicle's human or autonomous driver. Driveline torque is adjusted so that the vehicle achieves and follows the requested vehicle speed. If method 500 judges that the vehicle cruise control system is activated, the answer is yes and method 500 proceeds to 514. Otherwise, the answer is no and method 500 proceeds to 530.

At 514, method 500 determines the requested vehicle speed and adjusts the requested vehicle speed for the effect of the Earth's gravity on the vehicle's speed in the longitudinal direction of the vehicle. Additionally, the requested vehicle speed is adjusted for wheel slip. In one example, the requested vehicle speed is adjusted for the Earth's gravity as described in blocks 202, 206, 302-308 of FIGS. 2 and 3. Further, the requested vehicle speed is adjusted for wheel slip as described at blocks 204, 206, and 402-412. The requested vehicle speed may be input via a human/machine interface and the requested vehicle speed is multiplied by gravity and wheel slip modifiers. The actual vehicle speed is subtracted from the requested vehicle speed that is adjusted for gravity and wheel slip. The result (e.g., vehicle speed error) is input to the vehicle speed controller as described in FIG. 2.

At 516, method 500 controls the vehicle speed responsive to the vehicle speed error. In one example, the vehicle speed is controlled as described at blocks 210 and 212 of FIG. 2. In particular, the vehicle speed is adjusted to the requested vehicle speed that has been modified for gravity and wheel slip via a proportional/integral controller. The proportional/integral controller may be of the type known in the art. Optionally, the vehicle speed may be adjusted via a linear quadratic regulator or other known controller. One or more electric machines that provide torque to the vehicle driveline are adjusted responsive to output of the vehicle speed controller and torque allocation logic as described at blocks 210 and 212 of FIG. 2. Method 500 proceeds to 518.

At 518, method 500 judges if the brake pedal has been applied. Method 500 may judge that the brake pedal has been applied based on output of a brake pedal sensor. If method 500 judges that the brake pedal has been applied, the answer is yes and method 500 proceeds to 520. Otherwise, the answer is no and method 500 proceeds to 534.

At 520, method 500 cancels the vehicle speed control mode and adjusts the requested speed of the vehicle responsive to accelerator pedal position, which is converted into a requested vehicle speed via the controller and a function that is indexed or referenced via accelerator pedal position. Alternatively, or in addition, the requested vehicle speed may be adjusted responsive to the brake pedal position. For example, if the brake pedal is applied a large amount, the requested vehicle speed may be reduced by a larger amount. If the brake pedal is applied a small amount, the requested vehicle speed may be reduced by a smaller amount. Method 500 returns to 512.

At 530, method 500 determines the requested vehicle speed according to accelerator pedal position and adjusts the requested vehicle speed for the effect of the Earth's gravity on the vehicle's speed in the longitudinal direction of the vehicle. The requested vehicle speed may be determined by indexing or referencing a table or function of empirically determined values according to accelerator pedal position. The table or function outputs the requested vehicle speed. In addition, the requested vehicle speed is adjusted for wheel slip. In one example, the requested vehicle speed is adjusted for the Earth's gravity as described in blocks 202, 206, 302-308 of FIGS. 2 and 3. Further, the requested vehicle speed is adjusted for wheel slip as described at blocks 204, 206, and 402-412. The requested vehicle speed may be input via a human/machine interface and the requested vehicle speed is multiplied by gravity and wheel slip modifiers. The actual vehicle speed is subtracted from the requested vehicle speed that is adjusted for gravity and wheel slip. The result (e.g., vehicle speed error) is input to the vehicle speed controller as described in FIG. 2.

At 532, method 500 controls the vehicle speed responsive to the vehicle speed error. In one example, the vehicle speed is controlled as described at blocks 210 and 212 of FIG. 2. In one example, the vehicle speed is adjusted to the requested vehicle speed that has been modified for gravity and wheel slip via a proportional/integral controller. The proportional/integral controller may be of the type known in the art. Optionally, the vehicle speed may be adjusted via a linear quadratic regulator or other known controller. One or more electric machines that provide torque to the vehicle driveline are adjusted responsive to output of the vehicle speed controller and torque allocation logic as described at blocks 210 and 212 of FIG. 2. Method 500 proceeds to 534.

At 534, method 500 judges if a rock crawl mode is requested via a human or autonomous driver. A request for a rock crawl mode may be made via a human/machine interface. A request for entering rock crawl mode may be indicated and stored in controller memory. If method 500 judges that rock crawl mode has been requested, the answer is yes and method 500 returns to 508. Otherwise, the answer is no and method 500 proceeds to exit.

At 550, method 500 continues to operate the vehicle in its presently selected mode. For example, if the vehicle is in a two-wheel drive street mode, power may be provided to two of the vehicle's four wheels. Method 500 proceeds to 552.

At 552, method 500 judges whether or not the vehicle is stuck (e.g., providing lack of forward or reverse progress in a vehicle drive path). Method 500 may judge that the vehicle is stuck if vehicle wheel speed exceeds actual vehicle speed (e.g., speed of the vehicle's body) by a threshold speed. If method 500 judges that the vehicle is stuck, the answer is yes and method 500 proceeds to 554. Otherwise, the answer is no and method 500 proceeds to exit.

At 554, method 500 judges if a first method to free the vehicle from its stuck conditions is requested. The first mode to free the vehicle may be requested via a human/machine interface. If method 500 judges that the first method to free the vehicle has been requested, then the answer is yes and method 500 proceeds to 590. Otherwise, the answer is no and method 500 proceeds to 556.

At 590, method 500 reduces a wheel torque demand or a requested wheel torque for a given or predetermined accelerator pedal position. For example, if the requested wheel torque is 100 newton-meters when the brake pedal is half applied and when the vehicle is not stuck, then the requested wheel torque may be reduced to a value of 10 newton-meters when the brake pedal is half applied and when the vehicle is stuck. The controller may interpret a requested wheel torque via a first transfer function when the vehicle is not stuck and the controller may interpret the requested wheel torque via a second transfer function when the vehicle is stuck. By reducing the requested torque request according to accelerator pedal position, it may be possible to advance the vehicle without slipping the wheels. Further, reducing the requested wheel torque with respect to one or more accelerator pedal positions, it may be possible for the vehicle's tires to climb mounds that may be near the vehicle's wheels. Method 500 proceeds to 592.

At 592, method 500 provides the requested wheel torque in a direction according to a position of a shift selector. For example, if the shift selector is in a drive (D) position, the requested wheel torque may be provided in a direction that causes the vehicle's wheels to rotate in a clockwise direction. If the shift selector is in a reverse (R) position, the requested wheel torque may be provided in a direction that causes the vehicle's wheels to rotate in a counter clockwise direction. The requested wheel torque is provided via the controller commanding the driveline electric machines to provide the requested wheel torque. The driveline electric machines output the requested wheel torque. Method 500 proceeds to 594.

At 594, method 500 judges if the vehicle is traveling in one direction for a longer distance than a threshold distance. For example, if the vehicle position changes by more than a threshold distance after the first method to free the vehicle has been engaged, the answer is yes and method 500 proceeds to 596. Thus, if method 500 judges that the vehicle is traveling in one direction for a longer distance than a threshold distance, then the answer is yes and method 500 proceeds to 596. Otherwise, the answer is no and method 500 returns to 590.

At 596, method 500 exits the first method to free the vehicle. The first method may be deactivated by increasing a wheel torque demand or a requested wheel torque for a given or predetermined accelerator pedal position. In particular, the controller may revert to interpreting a requested wheel torque according to a first transfer function. Method 500 proceeds to exit.

At 556, method 500 judges if a second method to free the vehicle from its stuck conditions is requested. The second mode to free the vehicle may be requested via a human/machine interface. If method 500 judges that the second method to free the vehicle has been requested, then the answer is yes and method 500 proceeds to 570. Otherwise, the answer is no and method 500 proceeds to 558. Method 500 engages the second method if the answer is yes and engages a third method if the answer is no.

At 570, method 500 adjusts wheel torque delivered to the rear wheels to a first predetermined amount and oscillates torque delivered to the front wheels. By applying a constant small amount of torque to the rear wheels and oscillating torque supplied to the front wheel, it may be possible to pin the front wheels against a mound of debris that may be in front of the front wheels so that oscillating the front wheels may reduce the height of the mound so that the front wheels may overcome the mound and free the vehicle. For example, torque supplied to the rear wheels may be a constant 10 newton-meters and torque supplied to the front wheels may be supplied in the form of a sinusoid that ranges from zero newton-meters to 15 newton-meters. Method 500 proceeds to exit after supplying a constant torque to the rear wheels and an oscillating torque to the front wheels.

At 558, method 500 judges if the accelerator pedal is applied (e.g., depressed from its fully released position) for longer than a threshold amount of time. Method 500 may make such a determination according to the accelerator pedal position and a timer. If method 500 judges that the accelerator pedal has been applied for longer than a threshold amount of time, the answer is yes and method 500 proceeds to 580. Otherwise, the answer is no and method 500 proceeds to 560.

At 560, method 500 judges if the accelerator pedal is fully released (e.g., in its base position) for longer than a threshold amount of time. Method 500 may make such a determination according to the accelerator pedal position and a timer. If method 500 judges that the accelerator pedal has been fully released for longer than a threshold amount of time, the answer is yes and method 500 proceeds to 580. Otherwise, the answer is no and method 500 proceeds to 562.

At 562, method limits the absolute value of wheel torque to less than a threshold torque and reverses a direction wheel torque is applied (e.g., clockwise or counter-clockwise) each time the accelerator pedal is fully released while the shifter (e.g., 118) is engaged for a forward direction of vehicle travel. Thus, the wheel torque may change from clockwise to counter-clockwise when an accelerator pedal is fully release and applied again within a threshold amount of time. This allows the human driver to rock the vehicle (e.g., move the vehicle in forward and reverse directions) without moving the shift selector position. Rather, the direction of vehicle motion is based on accelerator pedal position. An example of this operation is shown in FIG. 7. Method 500 proceeds to 564.

At 564, method 500 judges if the vehicle is traveling in one direction for a longer distance than a threshold distance. For example, if the vehicle position changes by more than a threshold distance after the third method to free the vehicle has been engaged, the answer is yes and method 500 proceeds to 596. Thus, if method 500 judges that the vehicle is traveling in one direction for a longer distance than a threshold distance, then the answer is yes and method 500 proceeds to 566. Otherwise, the answer is no and method 500 returns to 558.

At 566, method 500 exits the third method to free the vehicle. The third method may be deactivated by allowing the vehicle to move only in the direction indicated by the shifter. Method 500 proceeds to exit.

At 580, method limits the absolute value of wheel torque to less than a threshold torque and provides wheel torque only in a direction indicated by the shifter (e.g., 118). Thus, the wheel torque may be provided in a clockwise direction when the accelerator pedal is applied and the shifter is in drive. This allows method 500 to move between rocking the vehicle in two directions and moving the vehicle in a forward only direction without having to change a position of the shifter. Method 500 proceeds to 582.

At 582, method 500 judges if the vehicle is traveling in one direction for a longer distance than a threshold distance. For example, if the vehicle position changes by more than a threshold distance after the third method to free the vehicle has been engaged, the answer is yes and method 500 proceeds to 584. Thus, if method 500 judges that the vehicle is traveling in one direction for a longer distance than a threshold distance, then the answer is yes and method 500 proceeds to 584. Otherwise, the answer is no and method 500 returns to 580.

At 584, method 500 exits the third method to free the vehicle. The third method may be deactivated by allowing the vehicle to move only in the direction indicated by the shifter. Method 500 proceeds to exit.

In this way, a stuck vehicle that is or is not in a rock crawling mode may be freed. Further, while in rock crawling mode, the vehicle speed may be adjusted responsive to accelerator pedal position or a cruise control speed. Further still, the requested vehicle speed may be adjusted responsive to the earth's gravity to maintain the requested vehicle speed. The requested vehicle speed may also be adjusted responsive to wheel slip to reduce tire wear.

Thus, the method of FIGS. 5 and 6 provides for a driveline operating method, comprising: operating a vehicle at a requested speed in a speed control mode via a controller; and adjusting the requested speed via the controller according to vehicle pitch. The method further comprises operating the vehicle in a rock crawl mode while operating the vehicle at the requested speed in the speed control mode and adjusting the requested speed according to vehicle roll. The method includes where the speed control mode adjusts wheel torque so that the vehicle moves at the requested speed, and further comprising: adjusting the requested speed according to vehicle yaw. The method further comprises adjusting the requested speed via the controller such that slip of a wheel is less than a threshold amount of wheel slip. The method includes where the wheel is a driven wheel, and where the rock crawl mode includes a vehicle upper threshold speed below which vehicle speed is maintained below. The method includes where the requested speed is based on a vehicle speed command from an accelerator pedal. The method includes where the requested speed is output from a cruise control system, and further comprising adjusting the requested speed based on a position of a brake pedal.

The method of FIGS. 5 and 6 provides for a driveline operating method, comprising: operating a vehicle at a requested speed in a speed control mode via a controller; and distributing a torque to operate the vehicle at the requested speed to a first axle and a second axle according to a vehicle suspension compression amount via the controller. The method includes where the requested speed is based on a speed that is commanded by a vehicle's human driver. The method includes distributing the torque to operate the vehicle at the requested speed to the first axle and the second axle according to vehicle suspension compression includes delivering a greater fraction of the torque to the first axle than to the second axle when a portion of a vehicle suspension closest to the first axle is compressed more than a portion of a vehicle suspension closest to the second axle.

In some examples, the method further comprises operating the vehicle with a differential of the first axle locked while operating the vehicle at the requested speed. The method further comprises reducing an amount of torque distributed to the first axle according to an amount of slip of a wheel directly coupled to the first axle. The method further comprises reducing an amount of torque distributed to the second axle according to an amount of slip of a wheel directly coupled to the second axle. The method further comprises adjusting the requested speed via the controller according to at least one of vehicle pitch, vehicle yaw, and vehicle roll.

Referring now to FIG. 7, a prophetic operating sequence according to the method of FIGS. 5 and 6 is shown. The vehicle operating sequence shown in FIG. 7 may be provided via the method of FIGS. 5 and 6 in cooperation with the system shown in FIGS. 1A-1C. The plots shown in FIG. 7 occur at the same time and are aligned in time. A shifter (not shown) is engaged in a drive position for the entire sequence of FIG. 7 and it is not moved.

The first plot from the top of FIG. 7 is a plot of vehicle operating mode versus time. The vertical axis represents a vehicle mode and the vehicle may be in a street mode or a rock crawling mode as indicated along the vertical axis. The horizontal axis represents time and time increases from the left side of the figure to the right side of the figure. Trace 702 represents vehicle operating mode and the vehicle is in rock crawling mode when trace 702 is at a higher level near the vertical axis arrow. The vehicle is in street mode when trace 702 is at a level near the horizontal axis.

The second plot from the top of FIG. 7 is a plot of a requested stuck vehicle mode versus time. The vertical axis represents requested vehicle stuck mode and the vehicle may be in a third vehicle stuck mode or off as indicated along the vertical axis. The horizontal axis represents time and time increases from the left side of the figure to the right side of the figure. Trace 704 represents the requested stuck vehicle mode and the requested stuck vehicle mode is mode three when trace 704 is at a higher level near the vertical axis arrow. The vehicle stuck mode is off when trace 704 is at a level near the horizontal axis.

The third plot from the top of FIG. 7 is a plot of accelerator pedal position versus time. The vertical axis represents accelerator pedal position and accelerator pedal position increases (e.g., the accelerator pedal is applied further from a base or fully released position) in the direction of the vertical axis up arrow. The horizontal axis represents time and time increases from the left side of the figure to the right side of the figure. Trace 706 represents the accelerator pedal position.

The fourth plot from the top of FIG. 7 is a plot of requested vehicle speed versus time. The vertical axis represents requested vehicle speed and the requested vehicle speed increases in the direction of the vertical axis arrow. The horizontal axis represents time and time increases from the left side of the figure to the right side of the figure. Trace 708 represents the requested vehicle speed.

The fifth plot from the top of FIG. 7 is a plot of the vehicle's wheels direction of rotation versus time. The vertical axis represents the vehicle's wheels direction of rotation and the direction of rotation is indicated along the vertical axis. The center position between clockwise and counter-clockwise indicates no wheel rotation. The horizontal axis represents time and time increases from the left side of the figure to the right side of the figure. Trace 710 indicates the direction of wheel rotation.

The sixth plot from the top of FIG. 7 is a plot of force of gravity on longitudinal vehicle motion versus time. The vertical axis represents the force of gravity on longitudinal vehicle motion. Force of gravity acting on the vehicle in the longitudinal direction tends to increase vehicle speed when the force of gravity is indicated above the horizontal axis. Force of gravity acting on the vehicle in the longitudinal direction tends to decrease vehicle speed when the force of gravity is indicated below the horizontal axis. The horizontal axis represents time and time increases from the left side of the figure to the right side of the figure. Trace 712 indicates the force of gravity on the vehicle in the longitudinal direction of the vehicle.

At time t0, vehicle is not operating in rock crawl mode and the vehicle is not operating in a stuck vehicle mode. The accelerator pedal is partially applied and the requested vehicle speed is zero since the vehicle is operating in a torque control mode. The vehicle's wheels are rotating in a clockwise direction and the force of gravity on longitudinal vehicle motion is zero since the vehicle is not operating in vehicle speed control mode.

At time t1, the vehicle driver requests entry into rock crawl mode and the vehicle enters rock crawl mode. The vehicle is not operating in the stuck vehicle mode and the accelerator pedal is operating at its previous level. The requested vehicle speed increases when the vehicle enters rock crawl mode and the vehicle is controlled in speed control mode (not shown). The wheel rotation direction is unchanged and the force of gravity on the longitudinal direction of vehicle motion is zero.

At time t2, the vehicle is engaged in rock crawl mode and the vehicle is not operating in the stuck vehicle mode. The accelerator pedal is operating at its previous level and the requested vehicle speed is increased in response to the force of gravity on the longitudinal direction of vehicle motion changing. The wheel rotation direction is unchanged.

At time t3, the vehicle is still engaged in rock crawl mode and the vehicle is not operating in the stuck vehicle mode. The accelerator pedal is operating at its previous level and the requested vehicle speed is decreased in response to the force of gravity on the longitudinal direction of vehicle motion changing. The wheel rotation direction is unchanged.

At time t4, the vehicle is engaged in rock crawl mode and the vehicle is not operating in the stuck vehicle mode. The accelerator pedal is operating at its previous level and the requested vehicle speed is decreased in response to the force of gravity on the longitudinal direction of vehicle motion changing. The wheel rotation direction is unchanged.

At time t5, the vehicle is engaged in rock crawl mode and the vehicle is not operating in the stuck vehicle mode. The accelerator pedal is operating at its previous level and the requested vehicle speed is increased in response to the force of gravity on the longitudinal direction of vehicle motion. The wheel rotation direction is unchanged.

At time t5, the vehicle is engaged in rock crawl mode, but the vehicle's wheels stop rotating. The requested vehicle speed is reduced to zero as the accelerator pedal is fully released. The vehicle is not operating in the stuck vehicle mode. The force of gravity on the longitudinal direction of vehicle motion is zero.

At time t6, the vehicle is engaged in rock crawl mode and the driver requests activation of stuck vehicle method 3. The requested vehicle speed is zero as the accelerator pedal is fully released. Stuck vehicle method 3 is activated and the force of gravity on the longitudinal direction of vehicle motion is zero.

At time t7, the vehicle is engaged in rock crawl mode and stuck vehicle method 3 is activated. The requested vehicle speed is zero since the accelerator pedal is fully released. The force of gravity on the longitudinal direction of vehicle motion is zero and the wheels begin to rotate in the clockwise direction.

Between time t7 and time t8, the vehicle is still engaged in rock crawl mode and stuck vehicle method 3 is activated. The requested vehicle speed is increased and then decreased before a threshold amount of time has lapsed. The force of gravity on the longitudinal direction of vehicle motion is zero.

At time t8, the vehicle is still engaged in rock crawl mode and stuck vehicle method 3 is activated. The requested vehicle speed is zero since the accelerator pedal is fully released. The force of gravity on the longitudinal direction of vehicle motion is zero. The wheels begin to rotate in a counter-clockwise direction shortly after time t8 when the accelerator pedal is applied a second time. The accelerator pedal is applied the second time before a threshold amount of time has lapsed. Consequently, the direction of wheel rotation is reversed without moving a position of the shifter.

Between time t8 and time t9, the vehicle is still engaged in rock crawl mode and stuck vehicle method 3 is activated. The requested vehicle speed is increased and then decreased before a threshold amount of time has lapsed. The force of gravity on the longitudinal direction of vehicle motion is zero.

At time t9, the vehicle is still engaged in rock crawl mode and stuck vehicle method 3 is activated. The requested vehicle speed is zero since the accelerator pedal is fully released. The force of gravity on the longitudinal direction of vehicle motion is zero. The wheels begin to rotate in a clockwise direction shortly after time t9 when the accelerator pedal is applied a third time. The accelerator pedal is applied the third time before a threshold amount of time has lapsed. Consequently, the direction of wheel rotation is reversed without moving a position of the shifter.

In this way, a requested speed of a vehicle operating in a speed control mode may be adjusted responsive to earth's gravity and wheel slip. Further, the vehicle may enter a stuck vehicle mode whereby the vehicle's direction of travel may be changed responsive to accelerator pedal position without adjusting a position of a shifter so that vehicle rocking may be performed more easily.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to a wide range of electric vehicle configurations. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
operating a vehicle at a requested speed in a speed control mode via a controller; determining a force that Earth's gravity exerts on a vehicle in a longitudinal direction of the vehicle via vehicle yaw, pitch, and roll; and adjusting the requested speed via the controller according to a gravity modifier, the gravity modifier being a function of the force that Earth's gravity exerts on the vehicle in the longitudinal direction of the vehicle, further comprising adjusting the requested speed via the controller according to a wheel slip modifier, the wheel slip modifier based on wheel slip of four wheels, and where the requested speed is output from a cruise control system, and further comprising adjusting the requested speed based on a position of a brake pedal.

2. The method of claim 1, further comprising operating the vehicle in a rock crawl mode while operating the vehicle at the requested speed in the speed control mode and adjusting the requested speed according to vehicle roll.

3. The method of claim 2, where the speed control mode adjusts wheel torque so that the vehicle moves at the requested speed, and further comprising: adjusting the requested speed according to vehicle yaw.

4. The method of claim 1, further comprising adjusting the requested speed via the controller such that slip of a wheel is less than a threshold amount of wheel slip.

5. The method of claim 4, where the wheel is a driven wheel, and where a rock crawl mode includes a vehicle upper threshold speed below which vehicle speed is maintained below.

6. The method of claim 1, where the requested speed is based on a vehicle speed command from an accelerator pedal.

7. A driveline operating method, comprising:
operating a vehicle at a requested speed in a speed control mode via a controller; and
distributing a torque to operate the vehicle at the requested speed to a first axle and a second axle according to a vehicle suspension compression amount via the controller, where distributing the torque to operate the vehicle at the requested speed to the first axle and the second axle according to vehicle suspension compression includes delivering a greater fraction of the torque to the first axle than to the second axle when a portion of a vehicle suspension closest to the first axle is compressed more than a portion of a vehicle suspension closest to the second axle, further comprising delivering a constant positive torque to the vehicle's rear wheels and delivering an oscillating torque to the vehicle's front wheels in response to the vehicle being stuck.

8. The method of claim 7, where the requested speed is based on a speed that is commanded by a vehicle's human driver, and where distributing the torque to operate the vehicle at the requested speed to the first axle and the second axle according to vehicle suspension compression includes delivering torque to the first axle and the second axle based on a scaling factor that is a function of vehicle suspension compression.

9. The method of claim 7, further comprising operating the vehicle with a differential of the first axle locked while operating the vehicle at the requested speed.

10. The method of claim 7, further comprising reducing an amount of torque distributed to the first axle according to an amount of slip of a wheel directly coupled to the first axle.

11. The method of claim 7, further comprising reducing an amount of torque distributed to the second axle according to an amount of slip of a wheel directly coupled to the second axle.

12. The method of claim 7, further comprising adjusting the requested speed via the controller according to at least one of vehicle pitch, vehicle yaw, and vehicle roll.

13. A driveline system, comprising:
a first electric machine coupled to a first axle;
a second electric machine coupled to a second axle;
a shift selector to select a direction of vehicle travel; and
a controller including executable instructions stored in non-transitory memory to rotate the first axle in a first direction via the first electric machine and to rotate the first axle in a second direction via the first electric machine according to accelerator pedal position while the shift selector is maintained in a single position, and further comprising additional instructions that cause the controller to deliver a constant positive torque to rear wheels of a vehicle and deliver an oscillating torque to front wheels of the vehicle in response to the vehicle being stuck.

14. The driveline system of claim 13, further comprising additional instructions to operate a vehicle that includes the first and second electric machines at a requested speed in a speed control mode, and adjusting the requested speed according to a gravity modifier that is based on a force that Earth's gravity exerts on a vehicle in a longitudinal direction of the vehicle, and where the gravity modifier is based on at least one of vehicle pitch, vehicle roll, and vehicle yaw.

15. The driveline system of claim 13, further comprising additional instructions to distribute a torque to operate a vehicle at a requested speed to the first axle and the second axle according to a vehicle suspension compression amount, where distributing the torque to operate the vehicle at the requested speed to the first axle and the second axle according to the vehicle suspension compression amount includes delivering a greater fraction of the torque to the first axle than to the second axle when a portion of a vehicle suspension closest to the first axle is compressed more than a portion of a vehicle suspension closest to the second axle.

16. The driveline system of claim 13, further comprising additional instructions to rotate the second axle in the first direction and to rotate the second axle in the second direction according to the accelerator pedal position while the shift selector is maintained in the single position.

17. The driveline system of claim 13, where the first axle changes from rotating in the first direction to rotating in the second direction in response to releasing an accelerator pedal.

18. The driveline system of claim 13, where the single position is a position that indicated that the vehicle is to travel in a forward direction.

* * * * *